(12) United States Patent
Zhen et al.

(10) Patent No.: US 11,209,915 B2
(45) Date of Patent: Dec. 28, 2021

(54) METHOD AND APPARATUS FOR PERFORMING DISPLAY OF CONTENT ACCORDING TO DETECTED MOVING TRACK

(71) Applicant: TENCENT TECHNOLOGY (SHENZHEN) COMPANY LIMITED, Shenzhen (CN)

(72) Inventors: Shaoan Zhen, Shenzhen (CN); Ning Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/529,590

(22) Filed: Aug. 1, 2019

(65) Prior Publication Data
US 2020/0042109 A1 Feb. 6, 2020

Related U.S. Application Data (63) Continuation of application No. PCT/CN2018/091221, filed on Jun. 14, 2018.

(30) Foreign Application Priority Data

Jun. 22, 2017 (CN) .......................... 201710481669.0

(51) Int. Cl.
*G06F 3/0486* (2013.01)
*G06F 3/041* (2006.01)
(Continued)

(52) U.S. Cl.
CPC ........ *G06F 3/0354* (2013.01); *G06F 3/04847* (2013.01); *G06F 3/04883* (2013.01)

(58) Field of Classification Search
CPC ... G06F 2203/0339; G06F 2203/04101; G06F 2203/04103–04113; G06F 2203/04809;
(Continued)

(56) References Cited

U.S. PATENT DOCUMENTS

2011/0099497 A1* 4/2011 Fok .................... H04W 4/60
 715/769
2012/0220264 A1* 8/2012 Kawabata .............. G06F 21/36
 455/411

(Continued)

FOREIGN PATENT DOCUMENTS

CN 104575552 4/2015
CN 105117038 12/2015

OTHER PUBLICATIONS

International Search Report dated Sep. 27, 2018 in PCT/CN2018/091221 filed Jun. 14, 2018. (With English Translation) p. 1-5.

(Continued)

*Primary Examiner* — Sanghyuk Park
(74) *Attorney, Agent, or Firm* — Oblon, McClelland, Maier & Neustadt, L.L.P.

(57) ABSTRACT

Aspects of the disclosure provide methods and apparatuses for displaying interface content. In an example, processing circuitry detects a moving track of a touch object on a touch screen of a terminal device. The moving track is represented by coordinates of the touch object varying along the moving track. Then, the processing circuitry determines, based on a preset relationship of the moving track and a control parameter for a control object on a user interface, a value of the control parameter for the control object that varies with the coordinates of the touch object along the moving track. The control object has content that is displayed on the touch screen. Further, the processing circuitry displays, on the touch screen, the content of the control object on the user (Continued)

interface according to the value of the control parameter that varies with the coordinates of the touch object along the moving track.

21 Claims, 7 Drawing Sheets

(51) Int. Cl.
    *G06F 3/0354*     (2013.01)
    *G06F 3/0484*     (2013.01)
    *G06F 3/0488*     (2013.01)

(58) Field of Classification Search
    CPC ....... G06F 3/03547; G06F 3/041–0428; G06F 3/0485–04886; G06F 1/1643; G06F 1/169; G06F 1/1692; G06F 3/0354
    See application file for complete search history.

(56) References Cited

U.S. PATENT DOCUMENTS

| | | | | |
|---|---|---|---|---|
| 2012/0266068 | A1* | 10/2012 | Ryman | G06F 9/452 |
| | | | | 715/719 |
| 2013/0067332 | A1* | 3/2013 | Greenwood | G06F 3/0488 |
| | | | | 715/720 |
| 2015/0066643 | A1* | 3/2015 | Choi | G06Q 30/0255 |
| | | | | 705/14.53 |
| 2016/0378329 | A1* | 12/2016 | Narita | G06F 3/04883 |
| | | | | 709/226 |

OTHER PUBLICATIONS

Written Opinion dated Sep. 27, 2018 in PCT/CN2018/091221 filed Jun. 14, 2018. p. 1-3.

* cited by examiner

METHOD AND APPARATUS FOR PERFORMING DISPLAY OF CONTENT ACCORDING TO DETECTED MOVING TRACK

RELATED APPLICATION

This application is a continuation of International Application No. PCT/CN2018/091221, filed on Jun. 14, 2018, which claims priority to Chinese Patent Application No. 201710481669.0, filed with the China National Intellectual Property Administration on Jun. 22, 2017 and entitled "METHOD AND APPARATUS FOR DYNAMICALLY DISPLAYING INTERFACE CONTENT AND DEVICE THEREOF". The entire disclosures of the prior applications are hereby incorporated by reference in their entirety.

FIELD OF THE TECHNOLOGY

This application relates to the field of Internet technologies, and in particular, to a method and an apparatus for dynamically displaying interface content and a device thereof.

BACKGROUND OF THE DISCLOSURE

When a screen of a terminal device displays content, a user often needs to perform complex operations to view details of the content. For example, when a displayed picture or text is relatively small, the user needs to enlarge an interface to clearly view details of the picture of detailed content of the text. For another example, when a video is played, some content flashes past, so that the user may need to repeatedly operate a playing line and pause playing, to attempt to freeze the video at a required video frame, and view details of the video frame.

SUMMARY

Embodiments of this application provide a method and an apparatus for dynamically displaying interface content and a device thereof, to provide a simple operation mechanism, so that a user can view content displayed on an interface.

Aspects of the disclosure provide methods and apparatuses for displaying interface content. In an example, a terminal device includes a touch screen and processing circuitry. The processing circuitry detects a moving track of a touch object on a touch screen of the terminal device. In some examples, the moving track is represented by coordinates of the touch object varying along the moving track. Then, the processing circuitry determines, based on a preset relationship of the moving track and a control parameter for a control object on a user interface, a value of the control parameter for the control object that varies with the coordinates of the touch object along the moving track. The control object has content that is displayed on the touch screen. Further, the processing circuitry displays, on the touch screen, the content of the control object on the user interface according to the value of the control parameter that varies with the coordinates of the touch object along the moving track.

In an embodiment, the processing circuitry calculates, according to a preset control algorithm associated with the control object, the value of the control parameter. The preset control algorithm takes the coordinates of the touch object as inputs and outputting the value of the control parameter. In another embodiment, the processing circuitry calculates, according to a preset control graph associated with the control object, the value of the control parameter. The preset control graph correlates the value of the control parameters with the coordinates of the touch object. In another embodiment, the processing circuitry determines, according to a preset control data table associated with the control object, the value of the control parameter. The preset control data table associates the value of the control parameter with the coordinates of the touch object.

In some examples, the processing circuitry determines the control object according to setting information of a user of the terminal device.

In some embodiments, the control object is a video element. The processing circuitry determines, according to preset control information associated with the video element, a time point for real time playing the content of the video element corresponding to the coordinates of the touch object. In an example, before the moving track of the touch object is detected, the video element is in a hidden state; and when the moving track of the touch object is detected, the processing circuitry switches the video element from the hidden state to a visible state. Then, the processing circuitry determines, according to preset area information corresponding to the video element, an interface area corresponding to the moving track at real time, and display, in the interface area corresponding to the moving track, from a video frame of the video element that corresponds to the time point for real time playing the content of the video element.

In some embodiments, the control object is a picture element. The processing circuitry determines, according to preset control information associated with the picture element, one or more displaying characteristics for the picture element corresponding to the coordinates of the touch object at real time. In an embodiment, before the moving track of the touch object is detected, the picture element is in a visible state on the user interface of the touch screen, and when the moving track of the touch object is detected, the processing circuitry is configured to display the picture element on the user interface of the touch screen according to displaying location and/or displaying color that are determined as the one or more displaying characteristics at real time corresponding to the coordinates of the touch object. In another embodiment, before the moving track of the touch object is detected, the picture element is in a hidden state, and when the moving track of the touch object is detected, the processing circuitry switches the picture element from the hidden state to a visible state. Then, the processing circuitry determines, according to preset area information associated with the picture element, an interface area corresponding to the coordinates of the touch object at real time, and displays, according to displaying location and/or displaying color that are determined as the one or more displaying characteristics corresponding to the coordinates of the touch object at real time, the picture element on the interface area corresponding to the coordinates of the touch object.

Moving track coordinates of a control end (also referred to as touch object) on the interface of the screen are monitored, the control parameter value corresponding to the moving track coordinates is obtained according to the preset control information corresponding to the control object, and the content of the control object is dynamically displayed on the interface of the screen according to the control parameter value. According to the solutions of the embodiments, a user can view required content by performing a simple operation.

DESCRIPTION OF EMBODIMENTS

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain this application and cannot be construed as a limitation to this application.

Figure 1:
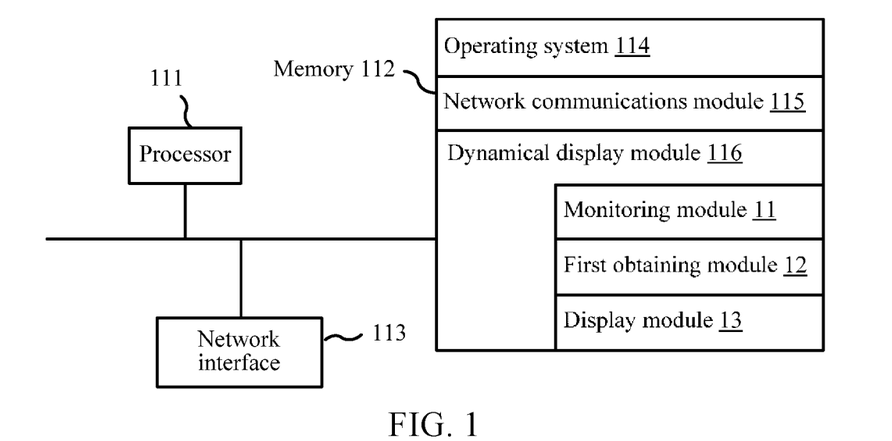
FIG. 1 is a schematic diagram of a terminal device according to an embodiment of this application.

Technical solutions of the embodiments may be implemented by using a terminal device. The terminal device may be any electronic device that has a touchscreen or that can be externally connected to a touchscreen, for example, a smartphone, a tablet computer, a game terminal, or a notebook computer. FIG. 1 is a schematic diagram of a terminal device according to an embodiment of this application. As shown in FIG. 1, the terminal device may include a processor 111, a memory 112, and a network interface 113.

The network interface 113 may enable the terminal device to communicate with another device in a network.

The processor 111 may be configured to execute instructions in the memory 112, to implement various functions.

The memory 112 stores an operating system 114, a network communications module 115, and a dynamical display module 116. The dynamical display module 116 is configured to implement the technical solutions of the embodiments.

In some embodiments, the dynamical display module 116 may include:

a monitoring module 11 that may monitor moving track coordinates of a control end (e.g., touch object) on an interface of a screen;

a first obtaining module 12 that may obtain, according to preset control information corresponding to a control object, a control parameter value corresponding to the moving track coordinates; and a display module 13 that may dynamically display content of the control object on the interface of the screen according to the control parameter value.

According to the method for dynamically displaying interface content provided in this embodiment of this application, the content of the control object can be dynamically displayed on the interface of the screen according to the control parameter value corresponding to the moving track coordinates (for example, sliding), so that it is convenient for a user to view the content by performing a simple operation.

It is noted that the control object in this embodiment of this application is not only a video, but may also be a picture, a text, or the like. The control object may be set according to an actual application requirement.

Figure 2:
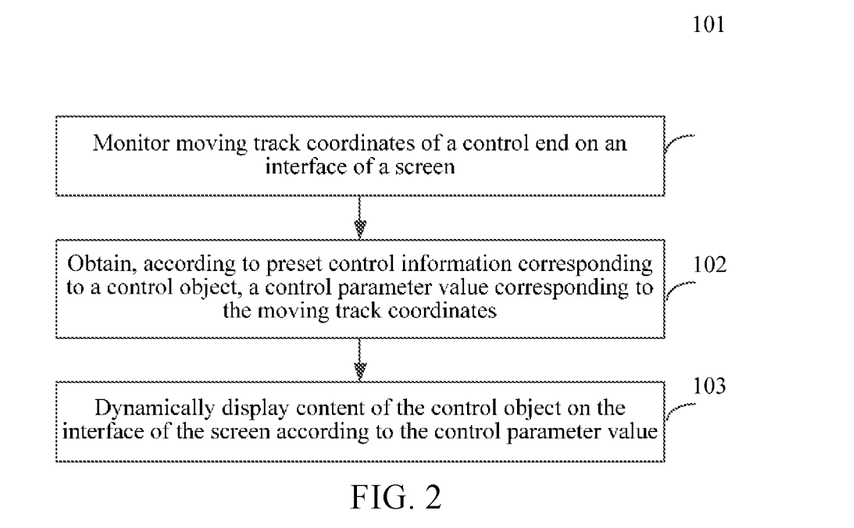
FIG. 2 is a flowchart of a method for dynamically displaying interface content according to an embodiment of this application.

FIG. 2 is a flowchart of a method for dynamically displaying interface content according to an embodiment of this application. The method may be performed by a terminal device, for example, the terminal device shown in FIG. 1. As shown in FIG. 2, the method may include the following steps.

Step 101: Monitor moving track coordinates of a control end (e.g., touch object) on an interface of a screen.

The control end may be a finger, a stylus, or the like. A user may perform an operation on the interface of the screen by selecting a particular control end according to a requirement, so that the terminal device obtains moving track coordinates of the control end.

Figures 3, 3A, 3B, 3C:
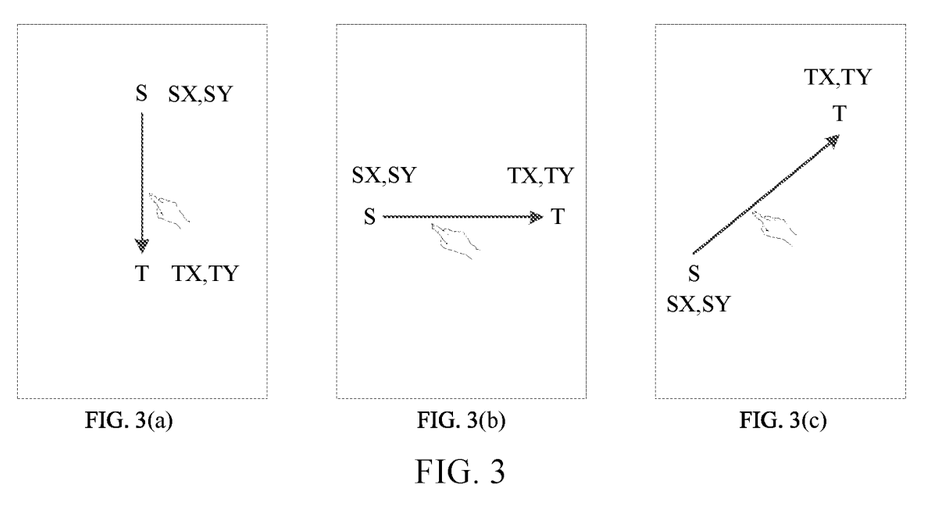
FIG. 3(a) is a schematic diagram of moving track coordinates according to an embodiment of this application.
FIG. 3(b) is a schematic diagram of moving track coordinates according to an embodiment of this application.
FIG. 3(c) is a schematic diagram of moving track coordinates according to an embodiment of this application.

It is noted that there is a plurality of moving tracks in this embodiment of this application. The moving tracks may be a sliding up-and-down track, a sliding left-and-right track, a circle-drawing (for example, clockwise circle-drawing and counterclockwise circle-drawing) track, and the like. As shown in FIG. 3, in a process of monitoring movement of a finger of a user from an S point to a T point on the interface of the screen, where coordinates of the S point are (SX, SY), and coordinates of the T point are (TX, TY), that is, in a process in which the finger performs an operation (for example, sliding), the coordinates of the control end are changed.

For example, in the coordinates (SX, SY) and the coordinates (TX, TY), SX and TX are the same, and SY and TY are different. For example, in FIG. 3(a), a result of sliding up and down by the finger of the user is that the vertical axis coordinate is changed.

For another example, in the coordinates (SX, SY) and the coordinates (TX, TY), SX and TX are different, and SY and TY are the same. For example, in FIG. 3(b), a result of sliding left and right by the finger of the user is that the horizontal axis coordinate is changed.

For still another example, in the coordinates (SX, SY) and the coordinates (TX, TY), SX and TX are different, and SY and TY are different. For example, in FIG. 3(c), a result of sliding up and down first and then left and right by the finger of the user is that the vertical axis coordinate and the horizontal axis coordinate are changed.

Therefore, corresponding moving track coordinates can be obtained according to an actual application scenario. That is, a sliding up-and-down operation that changes the vertical axis coordinate may be selected, or a sliding left-and-right operation that changes the horizontal axis coordinate may be selected, or a combination thereof that change the vertical axis coordinate and the horizontal axis may be selected.

Figures 4, 4A, 4B:
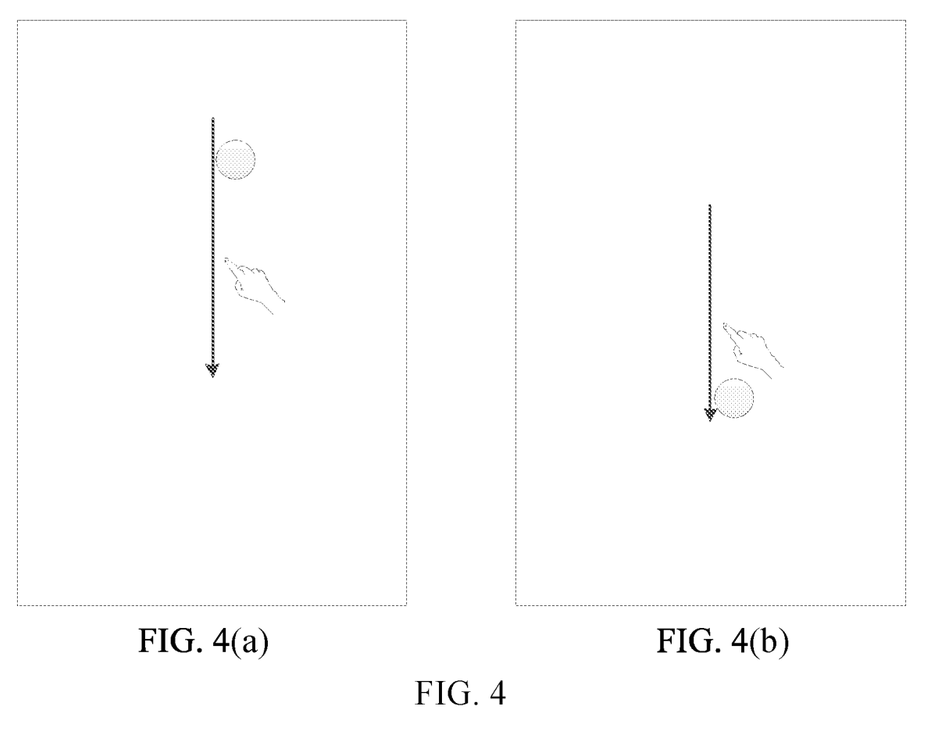
FIGS. 4(a)-(b) show schematic diagrams of a movement change of icon sliding according an embodiment of this application.

To further improve user experience, in a process in which the finger performs an operation, the user may be reminded, by moving any icon such as a circle or a star, that the user is performing a specific operation. Moving of the icon with the finger indicates a moving track direction. Using a circle in FIGS. 4(a)-(b) as an example, if the user manually slides downward, the circle is moved downward; or if the user slides upward, the circle is moved upward. A specific movement picture may be selected and set according to an actual application, to satisfy a user requirement.

Step 102: Obtain, according to preset control information corresponding to a control object, a control parameter value corresponding to the moving track coordinates.

Step 103: Display content of the control object on the interface of the screen according to the control parameter value.

In various embodiments, the control parameter value corresponding to the moving track coordinates may be obtained in many manners according to the preset control information corresponding to the control object. For example, the control parameter value corresponding to the moving track coordinates may be calculated according to a preset control algorithm corresponding to the control object. For another example, the control parameter value corresponding to the moving track coordinates may be calculated according to a preset control graph corresponding to the control object. For still another example, the control parameter value corresponding to the moving track coordinates is obtained by querying a preset control data table corresponding to the control object.

The foregoing manners are merely examples for describing obtaining, according to the preset control information corresponding to the control object, the control parameter value corresponding to the moving track coordinates, and another manner may be selected or set according to an actual application requirement.

It may be understood that, a one-to-one correspondence between the control object and the control information may be pre-stored. For example, the control object is a, control information b may be obtained through calculation in a corresponding mapping table or a related algorithm by using a, that is, the control object and the control information have a binding relationship. After the control information is obtained, the control parameter value corresponding to the moving track coordinates can be calculated.

Different control objects correspond to different control parameter values. The control parameter value may be determined according to an actual application scenario. For example, when the control object is a video, the control parameter value may be a playing time point. When the control object is a picture, the control parameter value may be a displaying location, a displaying color, or the like. For example, when the control parameter value is a playing time point, video content may be dynamically displayed on the interface of the screen according to the playing time point.

In some embodiments, there may be a plurality of determined control objects, the control object may be determined before the control parameter is obtained. For example, a control object that needs to be dynamically displayed may be obtained according to setting information of the user. The user may set the control object to a video on the interface of the screen, or set the control object to a picture color on the surface of the screen, or the like. The user may select a corresponding control object through manual inputting, or may input a corresponding control object through voice.

In conclusion, according to the method for dynamically displaying interface content provided in this embodiment of this application, the moving track coordinates of the control end on the interface of the screen are monitored, the control parameter value corresponding to the moving track coordinates are obtained according to the preset control information corresponding to the control object, and finally the content of the control object is dynamically displayed on the interface of the screen according to the control parameter value. The content of the control object is dynamically displayed based on diversified moving track coordinates obtained through user control, so that diversified display effects can be obtained; in addition, for the user, operations are simple, easy, and convenient for the user to use, man-machine interaction is improved, and user experience is improved.

Figure 5:
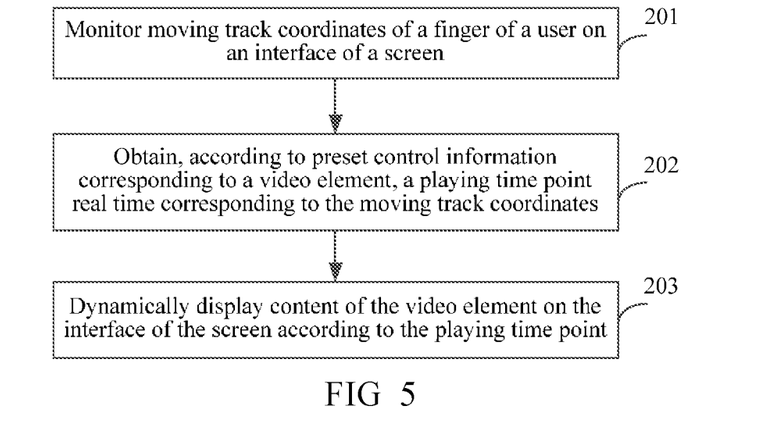
FIG. 5 is a flowchart of a method for dynamically displaying interface content according to an embodiment of this application.

FIG. 5 is a flowchart of a method for dynamically displaying interface content according to an embodiment of this application. As shown in FIG. 5, the method may include the following steps.

Step 201: Monitor moving track coordinates of a finger of a user on an interface of a screen.

Step 202: Obtain, according to preset control information corresponding to a video element, a playing time point real time corresponding to the moving track coordinates.

In some embodiments, each frame of playing image of a video may be set according to an actual requirement. For example, in a video, frames of playing images may be played at a constant speed, or the $1^{st}$ to an $n^{th}$ frames of playing images may be set to a playing time point Q, and an $m^{th}$ to the last frames of images may be set to a playing time point W.

Figure 6:
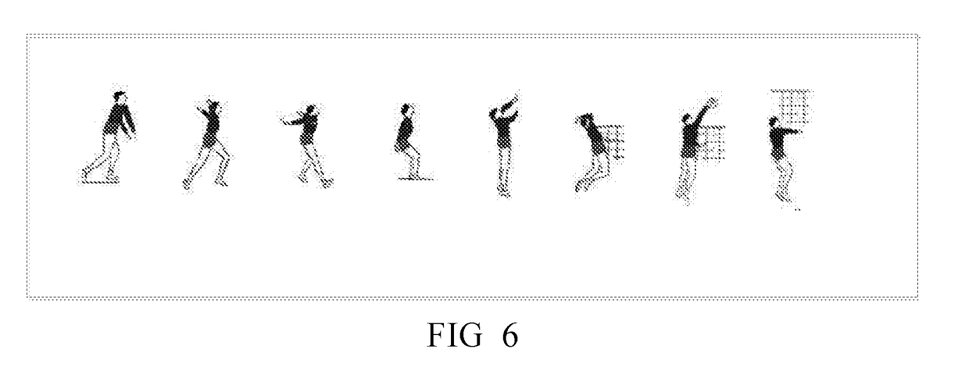
FIG. 6 is a schematic diagram of a video playing image according to an embodiment of this application.

In an example, as shown in FIG. 6, each frame of playing image may be clearly viewed from images played from the $0^{th}$ second to the fourth second at an interval of 0.5 second. In FIG. 6, a body action in each frame of playing image can be seen, and different frames of playing images correspond to different playing time points. That is, one frame of image is played at an interval of 0.5 second from the $0^{th}$ second to the fourth second. Frames of playing images display different body actions, and different frames of playing images correspond to different playing time points.

In some examples, during operation performed by the user, the moving track coordinates are changed, that is, the playing time point of the video element is also changed, so that the playing time point real time corresponding to the moving track coordinates can be obtained from the preset control information corresponding to the video element.

In various embodiments, there may be a plurality types of control information. For example, the control information may be a control algorithm, so that the playing time point real time corresponding to the moving track coordinates is obtained through calculation by inputting the moving track coordinates into the corresponding control algorithm. For another example, the control information may be a control graph, so that the playing time point real time corresponding to the moving track coordinates is obtained by calculating the moving track coordinates according to the control graph. For still another example, the control information may be a control data table, so that the playing time point real time corresponding to the moving track coordinates is obtained by calculating the moving track coordinates according to the control data table. The preset control information corresponding to the video element may be selected, set, and stored according to an actual application requirement.

The control graph describes the playing time point corresponding to the moving track coordinates, and the control data table records the playing time point corresponding to the moving track coordinates.

Figure 7:
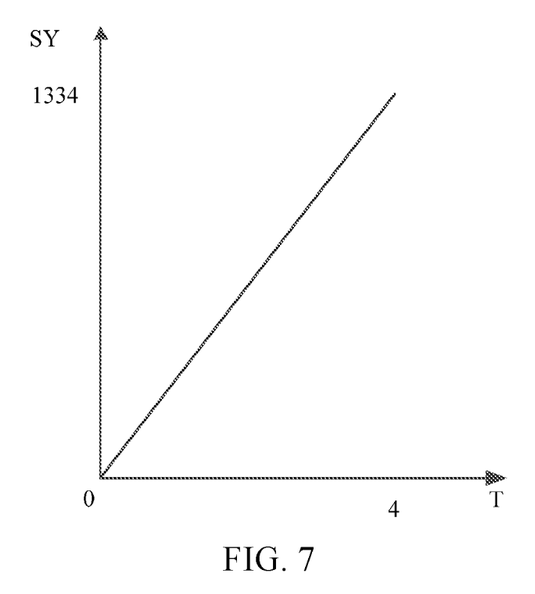
FIG. 7 is a schematic diagram of a relationship between a video playing image and a time point according to an embodiment of this application.

For example, when the finger of the user slides on the interface of the screen, the vertical axis coordinate is changed to SY, and the video playing time point corresponds to the $0^{th}$ second to the $4^{th}$ second as SY changes from 0 to 1134, that is, when SY=0, T=0; or when SY=1134, T=4. As shown in FIG. 7, a linear relationship can be seen, and is expressed as SY=333.5T by using a mathematical formula. That is, a value of corresponding SY may be calculated when a value of T is learned of, and also a corresponding value of T may be calculated when a value of SY is learned of.

Therefore, as the finger slides, a video on the interface of the screen is changed with a change of SY of the moving track coordinates and a change of the playing time point T of the video, to interactively display a video image.

In some embodiments, as the finger slides, for the video on the interface of the screen, the video playing image is changed as the moving track coordinates are changed. A threshold of moving track coordinates may be preset. As the finger slides, when the moving track coordinates exceed the threshold, complete playing, full-screen playing, or the like is implemented. These operations may be set according to an actual application requirement. That is, as the finger slides, for the video on the interface of the screen, the video playing image is changed as the moving track coordinates are changed. A moving track coordinates threshold may be preset. As the finger slides, when the moving track coordinates exceed the threshold, complete playing, full-screen playing, or the like is implemented. These operations may be set according to an actual requirement.

Step 203: Dynamically display content of the video element on the interface of the screen according to the playing time point.

In various embodiments, the current interface of the screen may have a video element, or a video element may exist when the finger of the user performs an operation on the interface of the screen. That is, the video element is originally in a visible state, or the video element is changed from an original hidden state to the visible state after a moving track of the control end on the interface of the screen is detected. That is, the method for dynamically displaying interface content according to this embodiment of this application is applicable to various display elements, for example, a video element displayed on the current interface of the screen, or a video element displayed in response to an operation performed by the user on the interface of the screen, that is, a video element converted from an original hidden state into a visible state when the moving track of the control end on the interface of the screen is detected.

In some embodiments, when the finger of the user slides, a video image is played. When the user stops sliding, the video image is stopped. When the finger of the user slides backward (for example, sliding up-to-down is changed to sliding down-to-up), the video image is played backward. The control mechanisms in the various embodiments are simple and high-efficient, and user experience is improved.

In some embodiments, when the moving track of the control end on the interface of the screen is not detected (e.g., before the moving track is detected), the video element on the interface of the screen is in the visible state. That is, the video is originally visible, and a data frame corresponding to the playing time point may be played on the interface of the screen directly according to the playing time point real time corresponding to the moving track coordinates.

In some embodiments, when the moving track of the control end on the interface of the screen is not detected (e.g., before the moving track is detected), the video element is in the hidden state. When the moving track of the control end on the interface of the screen is detected, the video element is in the visible state on the interface of the screen, that is, the video is converted from the original hidden state into the visible state. An interface area real time corresponding to the moving track coordinates may be obtained according to preset area information corresponding to the video element, and a data frame at the playing time point real time corresponding to the moving track coordinates is displayed in the interface area real time corresponding to the moving track coordinates.

In some embodiments, a correspondence between a video element and area information is prestored, so that the interface area real time corresponding to the moving track coordinates can be obtained according to the area information, and finally the data frame at the playing time point real time corresponding to the moving track coordinates is displayed in the interface area.

In conclusion, according to the method for dynamically displaying interface content provided in this embodiment of this application, the moving track coordinates of the finger of the user on the interface of the screen is monitored, the playing time point real time corresponding to the moving track coordinates is obtained according to the preset control information corresponding to the video element, and finally the content of the video element is dynamically displayed on the interface of the screen according to the playing time point. Therefore, the operations are simple, easy, and convenient for the user to use.

In some embodiments, the method for dynamically displaying interface content according to this embodiment of this application can be applied to commercial advertisements, and a proper moving track coordinates threshold may be selected according to an actual application requirement. For example, when the user slides to play a several-second video advertisement, and moving track coordinates exceed a threshold thereof, the video advertisement is completely played, thereby further improving the user experience.

Figure 8:
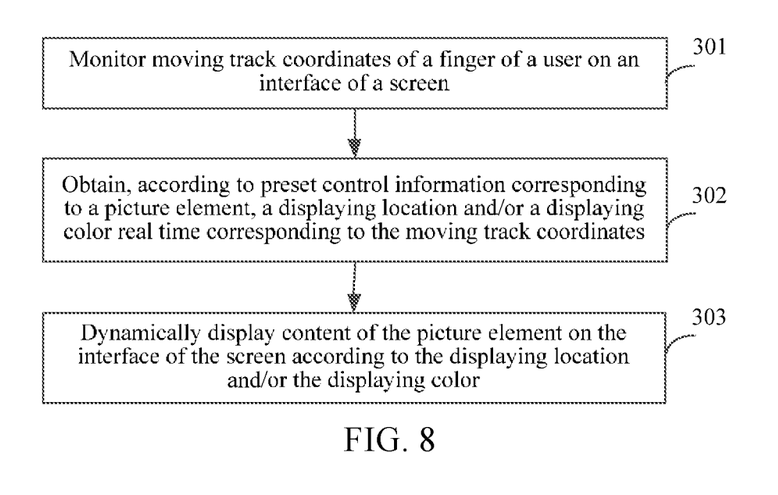
FIG. 8 is a flowchart of a method for dynamically displaying interface content according to an embodiment of this application.

FIG. 8 is a flowchart of a method for dynamically displaying interface content according to another embodiment of this application. As shown in FIG. 8, the method for dynamically displaying interface content includes:

Step 301: Monitor moving track coordinates of a finger of a user on an interface of a screen.

Step 302: Obtain, according to preset control information corresponding to a picture element, a displaying location and/or a displaying color real time corresponding to the moving track coordinates.

Figure 9:
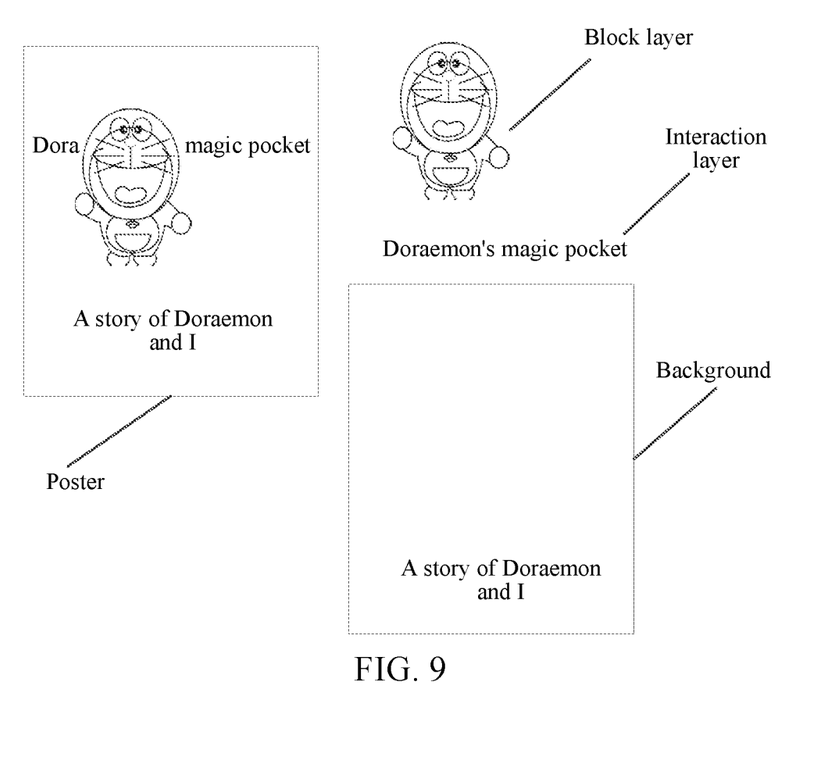
FIG. 9 is a schematic diagram of a poster picture according to an embodiment of this application.

In some embodiments, a picture may include a plurality of layers. In an example, as shown in FIG. 9, a picture is a poster, the picture is divided into a block layer, an interaction layer, and a background, and picture elements may be distributed on one or more layers. That is, the control object may be a picture element on one or more of the block layer, the interaction layer, and the background.

In some embodiments, as shown in FIG. 9, in the poster, the block layer is a picture of Doraemon, the interaction layer is "Doraemon's magic pocket", and the background is a picture box and "A story of Doraemon and I". Any of them can be used as the control object.

In some examples, during operation performed by the finger of the user, the moving track coordinates are changed, that is, the displaying location and the displaying color of the picture element are also correspondingly changed, so that the displaying location and/or the displaying color real time corresponding to the moving track coordinates can be obtained from the preset control information corresponding to the picture element.

In some further embodiments, there is a plurality of types of control information. For example, the control information is a control algorithm, so that the displaying location and/or the displaying color real time corresponding to the moving track coordinates is obtained through calculation by inputting the moving track coordinates into the corresponding control algorithm. Alternatively, the control information may be a control graph, so that the displaying location and/or the displaying color real time corresponding to the moving track coordinates is obtained by calculating the moving track coordinates according to the control graph. For still another example, the control information may be a control data table, so that the displaying location and/or the displaying color real time corresponding to the moving track coordinates is obtained by calculating the moving track coordinates according to the control data table. The preset control information corresponding to the picture element may be selected, set, and stored according to an actual application requirement.

Figure 10:
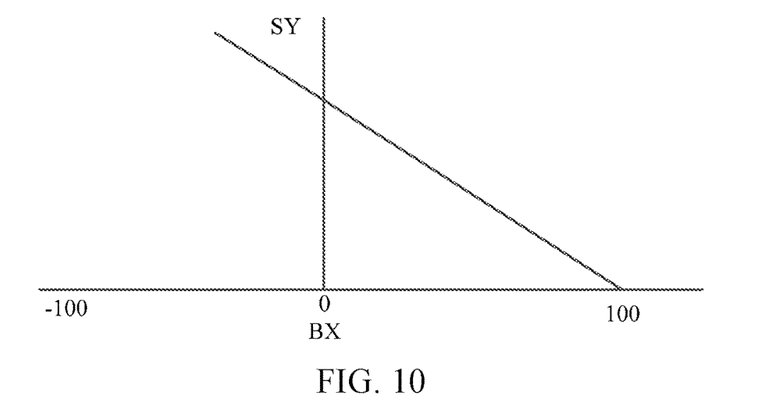
FIG. 10 is a schematic diagram of a relationship between a picture element and a displaying location according to an embodiment of this application.

In a possible implementation, when the finger of the user slides on the interface of the screen, the vertical axis coordinate is changed to SY, and a displaying location of the interaction layer corresponds to 100 to −45 as SY changes from 0 to 1134, that is, when SY=0, BX=100; or when SY=1134, BX=−45. As shown in FIG. 10, a linear relationship can be seen, and is expressed as SY=−9.2BX+920 by using a mathematical formula. Therefore, as the finger slides, the picture element on the interface of the screen is changed with a change of SY of the moving track coordinates and a change of the location BX of the picture element on the interaction layer, to implement interactive display.

It is noted that a specific picture element location parameter may be selected and set according to an actual application requirement.

Step 303: Dynamically display content of the picture element on the interface of the screen according to the displaying location and/or the displaying color.

It is noted that, the current interface of the screen may have a picture element, or a picture element may exist when the finger of the user performs an operation on the interface of the screen. That is, that the picture element is originally in a visible state, or that the picture element is changed from an original hidden state to the visible state after a moving track of the control end on the interface of the screen is detected are applicable to the method for dynamically displaying interface content according to this embodiment of this application.

It may be understood that, when the finger of the user slides, the displaying location and/or the displaying color of the picture element is changed. When the user stops sliding, the change is stopped. When the finger of the user slides backward (for example, sliding up-to-down is changed to sliding down-to-up), the displaying location and/or the displaying color changes backward. The control is simple and effective, and user experience is improved.

In a scenario, when the moving track of the control end on the interface of the screen is not detected, the picture element on the interface of the screen is in the visible state. That is, the video is originally visible, and the picture element may be displayed on the interface of the screen directly according to the displaying location and/or displaying color real time corresponding to the moving track coordinates.

In another scenario, when the moving track of the control end on the interface of the screen is not detected (e.g., before the moving track is detected), the picture element is in the hidden state. When the moving track of the control end on the interface of the screen is detected, the picture element is in the visible state on the interface of the screen, that is, the video is converted from the original hidden state into the visible state. An interface area real time corresponding to the moving track coordinates may be obtained according to preset area information corresponding to the picture element, and the picture element having the displaying location and/or the displaying color real time corresponding to the moving track coordinates is displayed in the interface area real time corresponding to the moving track coordinates.

In some embodiments, a correspondence between a video element and area information is prestored, so that the interface area real time corresponding to the moving track coordinates can be obtained according to the area information, and finally the picture element having the displaying location and/or the displaying color real time corresponding to the moving track coordinates is displayed in the interface area.

Figure 11:
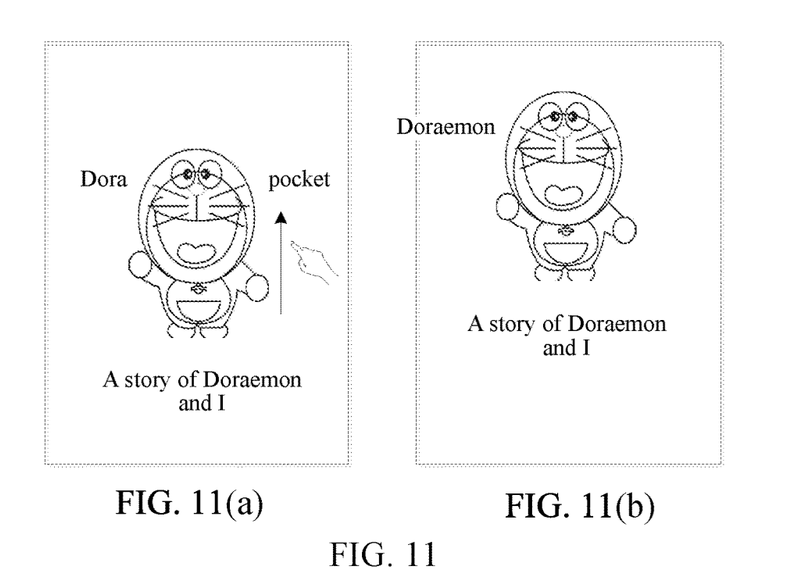
FIGS. 11(a)-(b) show schematic diagrams of a change of a displaying location of a picture element on an interaction layer according to an embodiment of this application.

In an application scenario, using a poster in FIG. 9 as an example, a displaying location of a picture element on an interaction layer is a control parameter value. As shown in FIGS. 11(a)-(b), as the finger of the user slides, the displaying location of the picture element on the interaction layer is changed. During sliding, picture elements on the block layer and the background remain unchanged, and the displaying location of "Doraemon's magic pocket" on the interaction layer is changed.

It is noted that FIGS. 11(a)-(b) are merely an example. The picture elements on the block layer and the background may be changed as the finger of the user slides.

In conclusion, according to the method for dynamically displaying interface content provided in this embodiment of this application, the moving track coordinates of the finger of the user on the interface of the screen is monitored, the displaying location and/or the displaying color real time corresponding to the moving track coordinates is obtained according to the preset control information corresponding to the picture element, and finally the content of the picture element is dynamically displayed on the interface of the screen according to the displaying location and/or the displaying color. Therefore, the operations are simple, easy, and convenient for the user to use, man-machine interaction is improved, and user experience is improved.

Corresponding to the method for dynamically displaying interface content provided in the foregoing several embodiments, an embodiment of this application further provides an apparatus for dynamically displaying interface content. The apparatus for dynamically displaying interface content provided in this embodiment of this application corresponds to the method for dynamically displaying interface content provided in the foregoing several embodiments. Therefore, the implementations of the method for dynamically displaying interface content are also applicable to the apparatus for dynamically displaying interface content provided in this embodiment, and details are not described in this embodiment again.

Figure 12:
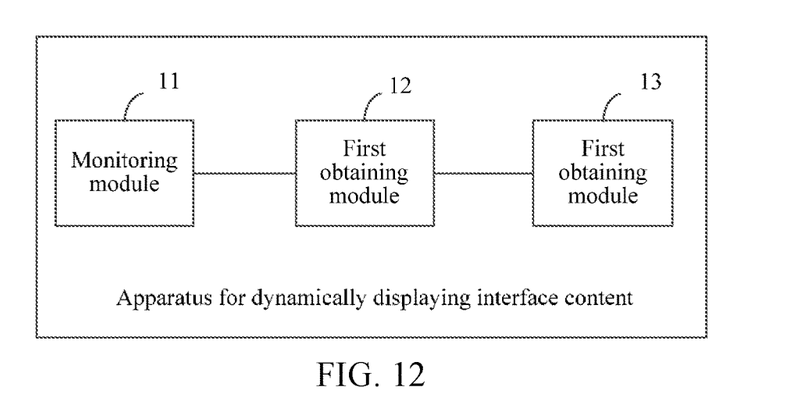
FIG. 12 is a schematic structural diagram of an apparatus for dynamically displaying interface content according to an embodiment of this application.

FIG. 12 is a schematic structural diagram of an apparatus for dynamically displaying interface content according to an embodiment of this application. As shown in FIG. 12, the apparatus for dynamically displaying interface content includes a monitoring module 11, a first obtaining module 12, and a display module 13.

The monitoring module 11 is configured to monitor moving track coordinates of a control end on an interface of a screen of a screen.

The first obtaining module 12 is configured to obtain, according to preset control information corresponding to a control object, a control parameter value corresponding to the moving track coordinates.

The display module 13 is configured to dynamically display content of the control object on the interface of the screen according to the control parameter value.

It is noted that in different application scenarios, manners of obtaining the moving track coordinates by the monitoring module 11 are different. Examples are described as follows:

First example: Moving track coordinates of a finger of a user on the interface of the screen is monitored.

Second example: Moving track coordinates of a stylus on the interface of the screen is monitored.

It is noted that in different application scenarios, manners of obtaining, by the first obtaining module 12 according to the preset control information corresponding to the control object, the control parameter value corresponding to the moving track coordinates are different. Examples are described as follows:

A first example: The first obtaining module 12 is specifically configured to calculate, according to a preset control algorithm corresponding to the control object, the control parameter value corresponding to the moving track coordinates.

A second example: The first obtaining module 12 is specifically configured to calculate, according to a preset control graph corresponding to the control object, the control parameter value corresponding to the moving track coordinates.

A third example: The first obtaining module 12 is specifically configured to obtain, by querying a preset control data table corresponding to the control object, the control parameter value corresponding to the moving track coordinates.

Figure 13:
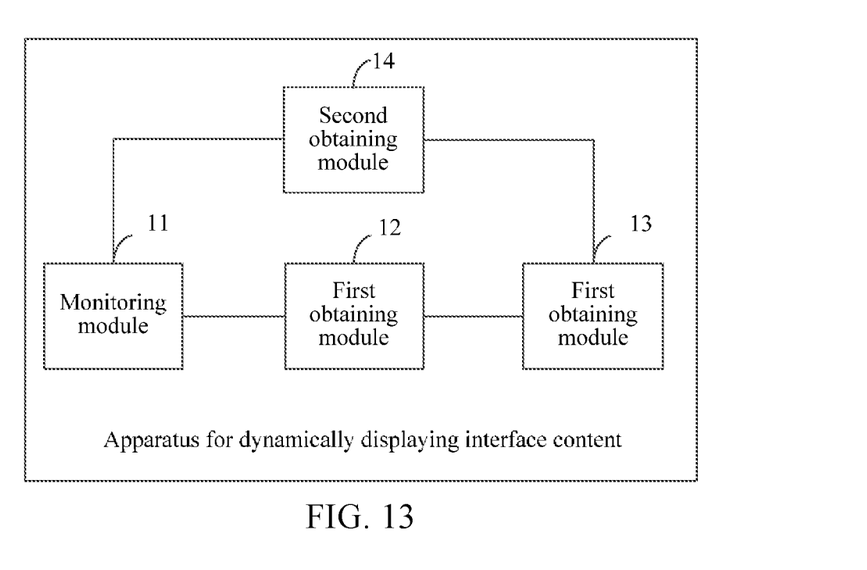
FIG. 13 is a schematic structural diagram of an apparatus for dynamically displaying interface content according to an embodiment of this application.

Further, in a possible implementation, as shown in FIG. 13, a second obtaining module 14 is further obtained based on FIG. 12.

The second obtaining module 14 is configured to obtain, according to setting information of a user, a control object that needs to be dynamically displayed on the interface of the screen according to the moving track coordinates.

It is noted that operations performed by the first obtaining module 12 are different for different control objects. For example, the control object is a video element, and the first obtaining module 12 is specifically configured to obtain, according to preset control information corresponding to the video element, a playing time point real time corresponding to the moving track coordinates.

Therefore, when a moving track of the control end on the interface of the screen is not detected (e.g., before the moving track is detected), the video element on the interface of the screen is in a visible state, and the display module 13 is specifically configured to play, according to the playing time point real time corresponding to the moving track coordinates, a data frame corresponding to the playing time point on the interface of the screen.

In some embodiments, when a moving track of the control end on the interface of the screen is not detected (e.g., before the moving track is detected), the video element is in a hidden state, and when the moving track of the control end on the interface of the screen is detected, the video element on the interface of the screen is in a visible state, and the display module 13 is specifically further configured to: obtain, according to preset area information corresponding to the video element, an interface area real time corresponding to the moving track coordinates; and display, in the interface area real time corresponding to the moving track coordinates, a data frame at the playing time point real time corresponding to the moving track coordinates.

For another example, the control object is a picture element, and the first obtaining module 12 is specifically further configured to obtain, according to preset control information corresponding to the picture element, a displaying location and/or a displaying color that real time correspond to the moving track coordinates.

It is noted that if a picture includes a plurality of layers, picture elements are distributed on one or more layers.

In some embodiments, when the moving track of the control end on the interface of the screen is not detected (e.g., before the moving track is detected), the picture element on the interface of the screen is in the visible state, and the display module 13 is specifically further configured to display the picture element on the interface of the screen according to the displaying location and/or the displaying color real time corresponding to the moving track coordinates.

In some embodiments, when the moving track of the control end on the interface of the screen is not detected (e.g., before the moving track is detected), the picture element is in the hidden state, and when the moving track of the control end on the interface of the screen is detected, the picture element on the interface of the screen is in the visible state, and the display module 13 is specifically further configured to: obtain, according to preset area information corresponding to the picture element, an interface area real time corresponding to the moving track coordinates; and display, according to the displaying location and/or the displaying color real time corresponding to the moving track coordinates, the picture element on the interface area real time corresponding to the moving track coordinates.

In conclusion, the apparatus for dynamically displaying interface content according to this embodiment of this application monitors the moving track coordinates of the control end on the interface of the screen; obtains, according to the preset control information corresponding to the control object, the control parameter value corresponding to the moving track coordinates; and finally dynamically displays the content of the control object on the interface of the screen according to the control parameter value. The content of the control object is dynamically displayed based on diversified moving track coordinates obtained through user control, so that diversified display effects can be obtained; in addition, for the user, operations are simple, easy, and convenient for the user to use, man-machine interaction is improved, and user experience is improved.

Figure 14:
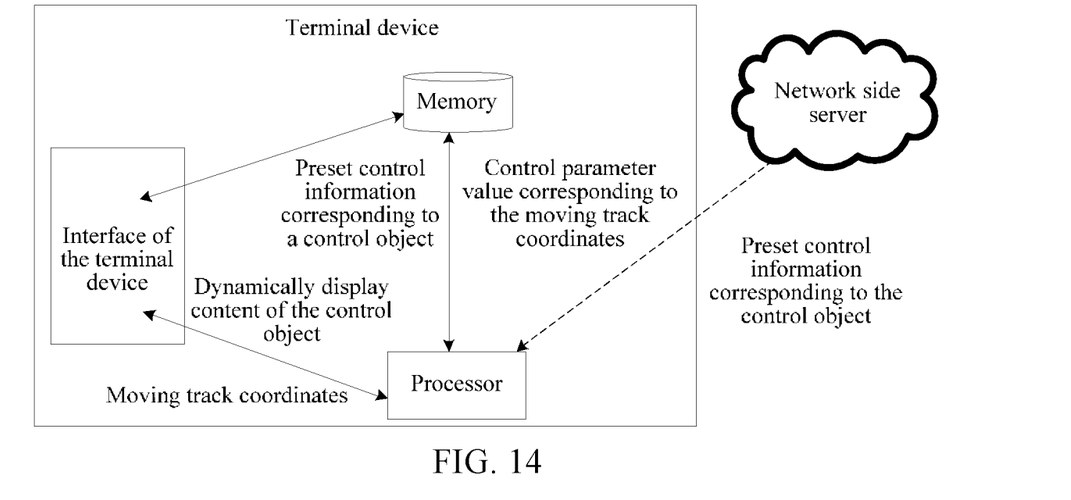
FIG. 14 is a schematic interaction flowchart of a method for dynamically displaying interface content according to an embodiment of this application.

To implement the foregoing embodiments, this application further provides a terminal device. FIG. 14 is a schematic interaction flowchart of a method for dynamically displaying interface content according to an embodiment of this application. This embodiment is described by using a terminal device side as an example. A process of dynamically displaying interface content on the terminal device side is that moving track coordinates of a control end on an interface of a screen is monitored on an interface of the terminal device, then preset control information corresponding to a control object may be obtained from a memory, or preset control information corresponding to a control object may be obtained from a network server side, so that a processor performs processing to obtain a control parameter value corresponding to the moving track coordinates.

Further, the processor dynamically displays content of the control object on the interface of the screen according to the control parameter value.

In conclusion, the terminal device according to this embodiment of this application monitors the moving track coordinates of the control end on the interface of the screen; obtains, according to the preset control information corresponding to the control object, the control parameter value corresponding to the moving track coordinates; and finally dynamically displays the content of the control object on the interface of the screen according to the control parameter value. The content of the control object is dynamically displayed based on diversified moving track coordinates obtained through user control, so that diversified display effects can be obtained; in addition, for the user, operations are simple, easy, and convenient for the user to use, man-machine interaction is improved, and user experience is improved.

To implement the foregoing embodiments, this application further provides a storage medium, configured to store an application program, and the application program is configured to perform the method for dynamically displaying interface content according to any of the embodiments of this application.

In the descriptions of this application, it should be understood that the terms such as "first" and "second" are used only for the purpose of description, and should not be understood as indicating or implying the relative importance or implicitly specifying the number of the indicated technical features. In view of this, a feature defined to be "first" or "second" may explicitly or implicitly include one or more features. In the descriptions of this application, "a plurality of" means two or more, unless otherwise definitely and specifically limited.

In the descriptions of this specification, descriptions of a reference term such as "an embodiment", "some embodiments", "an example", "a specific example", or "some examples" means that a specific feature or characteristic that is described with reference to the embodiment or the example is included in at least one embodiment or example of this application. In this specification, schematic descriptions of the foregoing terms do not necessarily directed at a same embodiment or example. Besides, the specific feature or the characteristic that is described may be combined in a proper manner in any one or more embodiments or examples. In addition, in a case that is not mutually contradictory, a person skilled in the art can combine or group different embodiments or examples that are described in this specification and features of the different embodiments or examples.

Any process or method in the flowcharts or described herein in another manner may be understood as indicating a module, a segment, or a part including code of one or more executable instructions for implementing a particular logical function or process step. In addition, the scope of exemplary embodiments of this application include other implementations which do not follow the order shown or discussed, including performing, according to involved functions, the functions basically simultaneously or in a reverse order, which should be understood by technical personnel in the technical field to which the embodiments of this application belong.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium even may be a paper that can be printed with the program or other proper media, because the paper or the other media, for example, may be optically scanned, next the program is obtained in an electronic manner by processing with editing, interpretation, or other proper manners if necessary, then the program is stored in a computer memory.

It should be understood that parts of this application may be implemented by using hardware, software, firmware, or combinations thereof. In the foregoing implementations, a plurality of steps or methods may be implemented by using software or firmware that are stored in a memory and are executed by a proper instruction execution system. For example, if the plurality of steps or methods is implemented by using software, which is the same as that in another implementation, the plurality of steps or methods is implemented by using any one or a combination of the following technologies that are known in the art: a discrete logic circuit having a logic gate circuit configured to implement a logic function to a data signal, an application-specific integrated circuit having a proper combined logic gate circuit, a programmable gate array (PGA), a field programmable gate array (FPGA), or the like.

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, functional units in the embodiments of this application may be integrated into one processing module, or each of the units may exist alone physically, or two or more units are integrated into one module. The integrated module may be implemented in a hardware form, or may be implemented in a form of a software functional module. If implemented in the form of software functional modules and sold or used as an independent product, the integrated module may also be stored in a computer-readable storage medium.

The aforementioned storage medium may be a read-only memory, a magnetic disk, or an optical disc. Although the embodiments of this application are shown and described above, it can be understood that, the foregoing embodiments are exemplary, and cannot be construed as a limitation to this application. Within the scope of the present disclosure, a person of ordinary skill in the art may make changes, modifications, replacement, and variations to the foregoing embodiments.

What is claimed is:

1. A method for performing display of content, comprising:
    detecting, by processing circuitry of a terminal device, a moving track of a touch object on a touch screen of the terminal device, the moving track being represented by coordinates of the touch object varying along the moving track;
    after the moving track is detected, obtaining, from a server, preset control information associated with the content, the preset control information specifying a conversion relationship between the coordinates of the touch object and a value of a control parameter for controlling a screen displaying location, a displaying color, or a displaying time point of the content;
    converting, by the processing circuitry and based on the conversion relationship, the coordinates of the touch object to the value of the control parameter; and
    performing the display of the content on the touch screen of the terminal device according to the screen displaying location, the displaying color, or the displaying time point of the content specified by the value of the control parameter.

2. The method according to claim 1, further comprising at least one of:
    detecting the moving track of a user finger on the touch screen; and
    detecting the moving track of a stylus on the touch screen.

3. The method according to claim 1, wherein the converting comprises at least one of:
    calculating, according to the conversion relationship specified as a preset control algorithm associated with the content, the value of the control parameter, the preset control algorithm taking the coordinates of the touch object as inputs and outputting the value of the control parameter;
    calculating, according to the conversion relationship specified as a preset control graph associated with the content, the value of the control parameter, the preset control graph correlating the value of the control parameter with the coordinates of the touch object; and
    determining, according to the conversion relationship specified as a preset control data table associated with the content, the value of the control parameter, the preset control data table associating the value of the control parameter with the coordinates of the touch object.

4. The method according to claim 1, further comprising:
    determining the content as a control object controllable by the detected moving track according to a user selection received by the terminal device.

5. The method according to claim 1, wherein
    the content corresponds to a video element, and
    the method further comprises:
        determining, according to the preset control information associated with the video element and the coordinates of the touch object, the displaying time point of the content that is a time point of the video element.

6. The method according to claim 5, wherein
    before the moving track of the touch object is detected, the video element is in a visible state on the touch screen of the terminal device, and
    when the moving track of the touch object is detected, the performing the display of the content comprises:
        displaying a video frame of the video element that corresponds to the time point of the video element.

7. The method according to claim 5, wherein
    before the moving track of the touch object is detected, the video element is in a hidden state, and
    when the moving track of the touch object is detected, the performing the display of the content comprises:
        switching the video element from the hidden state to a visible state;
        obtaining, according to preset area information corresponding to the video element, an interface area corresponding to the moving track; and
        displaying, in the interface area corresponding to the moving track, a video frame of the video element that corresponds to the time point of the video element.

8. The method according to claim 1, wherein
    the content corresponds to a picture element, and
    the method comprises:
        obtaining, according to the preset control information associated with the picture element, one or more displaying characteristics for the picture element corresponding to the coordinates of the touch object.

9. The method according to claim 8, wherein the picture element is in one or more layers of a picture.

10. The method according to claim 8, wherein
    before the moving track of the touch object is detected, the picture element is in a visible state on the touch screen of the terminal device, and
    when the moving track of the touch object is detected, the performing the display of the content comprises:
        displaying the picture element according to the screen displaying location or the displaying color that is determined as the one or more displaying characteristics corresponding to the coordinates of the touch object.

11. The method according to claim 8, wherein
    before the moving track of the touch object is detected, the picture element is in a hidden state, and
    when the moving track of the touch object is detected, the performing the display of the content comprises:
        switching the picture element from the hidden state to a visible state;
        obtaining, according to preset area information associated with the picture element, an interface area corresponding to the coordinates of the touch object; and
        displaying the picture element in the interface area and according to the screen displaying location or the displaying color that is determined as the one or more displaying characteristics corresponding to the coordinates of the touch object.

12. An apparatus for performing display of content, comprising:
    processing circuitry configured to:

detect a moving track of a touch object on a touch screen, the moving track being represented by coordinates of the touch object varying along the moving track;

after the moving track is detected, obtain, from a server, preset control information associated with the content, the preset control information specifying a conversion relationship between the coordinates of the touch object and a value of a control parameter for controlling a screen displaying location, a displaying color, or a displaying time point of the content;

convert, based on the conversion relationship, the coordinates of the touch object to the value of the control parameter; and perform the display of the content on the touch screen according to the screen displaying location, the displaying color, or the displaying time point of the content specified by the value of the control parameter.

13. The apparatus according to claim 12, wherein the processing circuitry is configured to:

calculate, according to the conversion relationship specified as a preset control algorithm associated with the content, the value of the control parameter, the preset control algorithm taking the coordinates of the touch object as inputs and outputting the value of the control parameter; or calculate, according to the conversion relationship specified as a preset control graph associated with the content, the value of the control parameter, the preset control graph correlating the value of the control parameter with the coordinates of the touch object; or determine, according to the conversion relationship specified as a preset control data table associated with the content, the value of the control parameter, the preset control data table associating the value of the control parameter with the coordinates of the touch object.

14. The apparatus according to claim 12, wherein the processing circuitry is configured to:

determine the content as a control object controllable by the detected moving track according to a user selection received by the apparatus.

15. The apparatus according to claim 12, wherein the content corresponds to a video element, and the processing circuitry is configured to:

determine, according to the preset control information associated with the video element and the coordinates of the touch object, the displaying time point of the content that is a time point of the video element.

16. The apparatus according to claim 15, wherein before the moving track of the touch object is detected, the video element is in a hidden state, and when the moving track of the touch object is detected, the processing circuitry is configured to:

switch the video element from the hidden state to a visible state;

determine, according to preset area information corresponding to the video element, an interface area corresponding to the moving track; and display, in the interface area corresponding to the moving track, a video frame of the video element that corresponds to the time point of the video element.

17. The apparatus according to claim 12, wherein the content corresponds to a picture element, and the processing circuitry is configured to:

determine, according to the preset control information associated with the picture element, one or more displaying characteristics for the picture element corresponding to the coordinates of the touch object.

18. The apparatus according to claim 17, wherein before the moving track of the touch object is detected, the picture element is in a visible state on the touch screen, and when the moving track of the touch object is detected, the processing circuitry is configured to:

display the picture element according to the screen displaying location or the displaying color that is determined as the one or more displaying characteristics corresponding to the coordinates of the touch object.

19. The apparatus according to claim 17, wherein before the moving track of the touch object is detected, the picture element is in a hidden state, and when the moving track of the touch object is detected, the processing circuitry is configured to:

switch the picture element from the hidden state to a visible state;

determine, according to preset area information associated with the picture element, an interface area corresponding to the coordinates of the touch object; and display the picture element in the interface area and according to the screen displaying location or the displaying color that is determined as the one or more displaying characteristics corresponding to the coordinates of the touch object.

20. A non-transitory computer-readable medium storing instructions which when executed by a computer cause the computer to perform:

detecting a moving track of a touch object on a touch screen, the moving track being represented by coordinates of the touch object varying along the moving track;

after the moving track is detected, obtaining, from a server, preset control information associated with content, the preset control information specifying a conversion relationship between the coordinates of the touch object and a value of a control parameter for controlling a screen displaying location, a displaying color, or a displaying time point the content;

converting, based on the conversion relationship, the coordinates of the touch object to the value of the control parameter; and performing the display of the content on the touch screen according to the screen displaying location, the displaying color, or the displaying time point of the content specified by the value of the control parameter.

21. The non-transitory computer-readable medium according to claim 20, wherein the converting comprises at least one of:

calculating, according to the conversion relationship specified as a preset control algorithm associated with the content, the value of the control parameter, the preset control algorithm taking the coordinates of the touch object as inputs and outputting the value of the control parameter;

calculating, according to the conversion relationship specified as a preset control graph associated with the content, the value of the control parameter, the preset control graph correlating the value of the control parameter with the coordinates of the touch object; and determining, according to the conversion relationship specified as a preset control data table associated with the content, the value of the control parameter, the preset control data table associating the value of the control parameter with the coordinates of the touch object.

* * * * *